Aug. 6, 1940.   H. M. HARMER   2,209,948
POLYPHASE RECTIFICATION FROM A SINGLE PHASE ELECTRICITY SUPPLY
Filed April 4, 1938   3 Sheets-Sheet 1
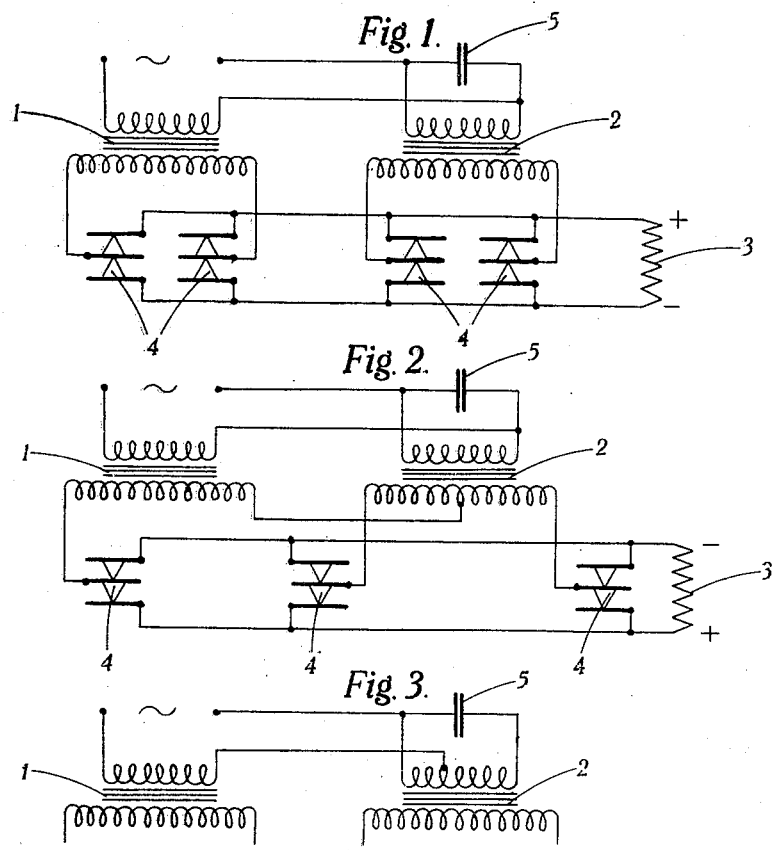
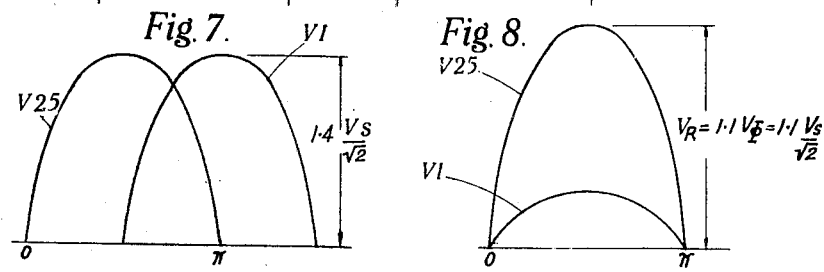
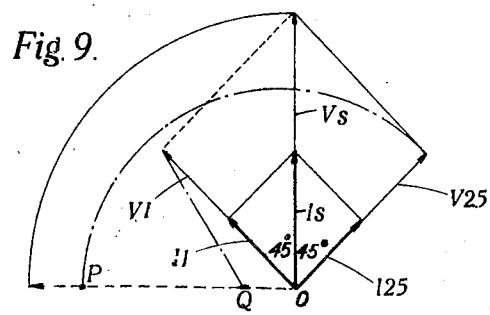
Inventor
Harold M. Harmer
By Sommers & Young
Attys Aug. 6, 1940.  H. M. HARMER  2,209,948

POLYPHASE RECTIFICATION FROM A SINGLE PHASE ELECTRICITY SUPPLY

Filed April 4, 1938  3 Sheets-Sheet 2

Inventor
Harold M. Harmer
By Sommers & Young
Attys.

Patented Aug. 6, 1940

2,209,948

UNITED STATES PATENT OFFICE 2,209,948

POLYPHASE RECTIFICATION FROM A SINGLE PHASE ELECTRICITY SUPPLY

Harold Martin Harmer, Highams Park, London, England

Application April 4, 1938, Serial No. 200,017
In Great Britain April 6, 1937

21 Claims. (Cl. 175—363)

This invention concerns improvements relating to the rectification of alternating current and has for one of its objects to provide a rectifying arrangement having advantages over known arrangements in respect of the character of the rectified current obtained.

A rectifying arrangement in accordance with the invention consists of transformers having reactance associated with them (for which transformers, other inductive reactor devices may be substituted in some cases) and having their primary windings connected in series and adapted for being connected across a source of single-phase alternating current and having their secondary windings connected in parallel through rectifying means from which a load can be supplied with rectified current, and a capacitative reactor device connected in parallel with one of the transformers, the reactances associated with the transformers and the reactance of the capacitative reactor device being so related that their respective secondary voltages have a polyphase relationship at normal loading of the arrangement. The expression reactances associated with the transformers is to be understood to include reactance possessed by the transformers themselves.

It is a particular advantage of the rectifying arrangement set forth above that it can be made to exhibit desirable regulation characteristics and, in particular, can be made to give an output voltage which decreases or remains substantially constant with decrease of loading from the normal value. For this purpose, the characteristics of inductive reactor devices with iron cores (the term "iron" is naturally to be understood to include permeable magnetic alloys) are utilised for obtaining a predetermined variation of the external reactance value of the parallel capacitative and inductive reactor devices. Decreasing or constant voltage with increase of loading or increase of supply voltage from the normal value may also be obtained.

Various embodiments of the invention by way of example will now be described and explained with reference to the accompanying drawings, in which:

Figures 1–6 are circuit diagrams of rectifying arrangements.

Figures 7 and 8 are explanatory wave diagrams.

Figure 9 is an explanatory vector diagram, and

Figure 1 illustrates a simple arrangement whereby four-wave rectification can be effected.

Figure 4:
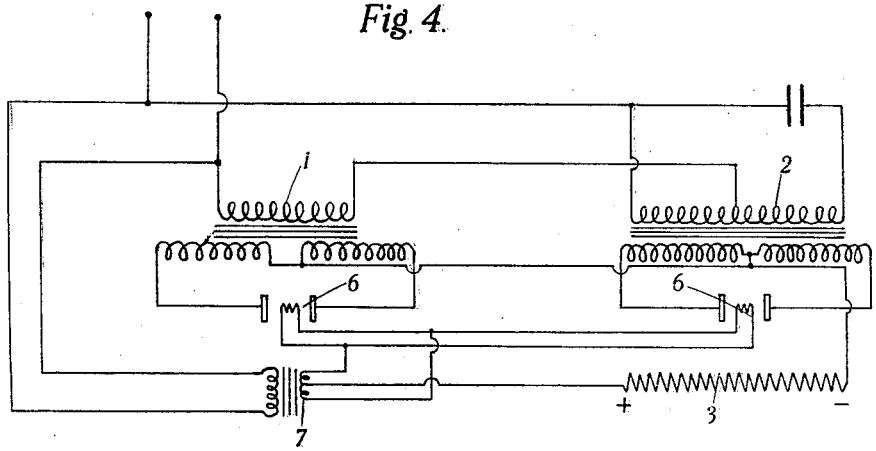

The primary windings of iron-cored transformers 1, 2 are connected in series across a source of single-phase alternating current and the secondary windings are connected in parallel with each other and with the common load, represented by a resistance 3, through rectifiers 4. In this example, dry metal rectifiers are shown. A condenser 5 is connected across the primary winding of the transformer 2.

As hereinafter explained more fully, the positive and negative reactances of the transformer 1 and of the transformer 2 and condenser 5 are so proportioned that, at the full or normal loading for which the rectifying arrangement is designed, the magnetic fluxes in their cores are such as would be produced by two ordinary transformers supplied with the phases of a two-phase supply. With the arrangement of Figure 1, the secondary voltages are also such as would be produced with a two-phase supply and four-wave rectification results.

However, the transformers 1, 2 may be connected in known manner, as by Scott's connection, for obtaining three or more phases of equal magnitude. An arrangement for six-wave rectification is shown in Figure 2.

Figure 10:
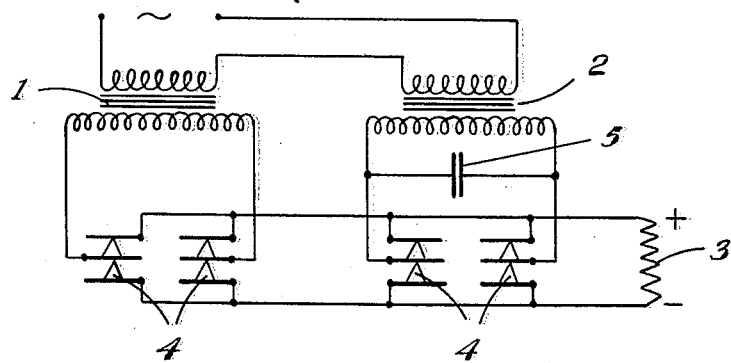
Figs. 10 and 11 are circuit diagrams of rectifying arrangements.

In practice it is preferred to work the condenser 5 at a higher voltage than the transformer 2. This can be achieved by the auto-transformer connection illustrated in Figure 3. By this means, the required capacity can be obtained, by reflection, with a smaller condenser. As shown in Fig. 10, the condenser 5 may be connected across the secondary winding of the transformer 2.

Figure 5:
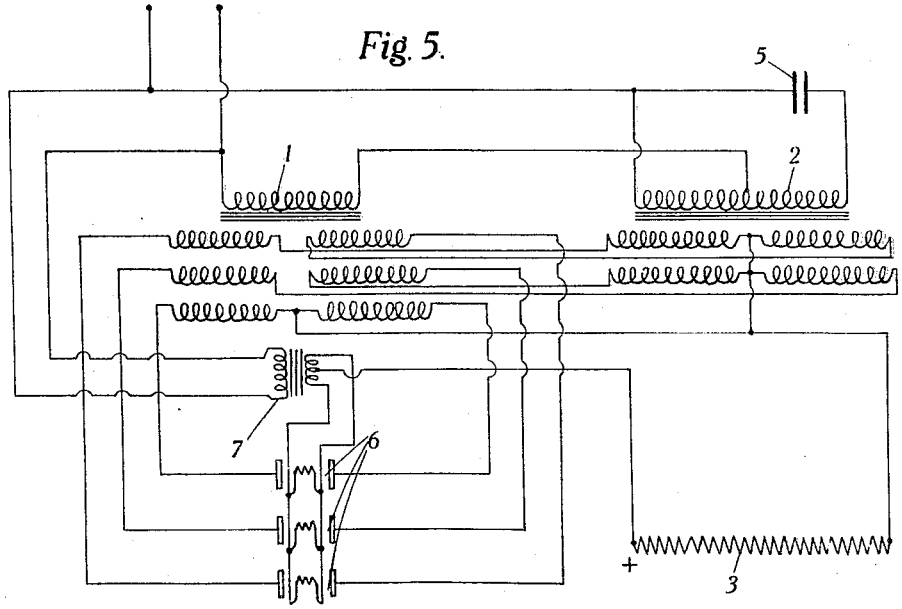

Other kinds of rectifiers may be employed, i. e. valve, arc or electrolytic rectifiers. Figures 4 and 5 illustrate arrangements, for four and six-wave rectification respectively, employing valve rectifiers. Two-anode rectifying valves 6 are employed with appropriate arrangements of secondary windings on the transformers 1 and 2. 7 indicates a separate filament transformer connected directly to the supply.

In all of these arrangements, the reactances of the transformer 1 and transformer 2 and condenser 5 (together, if required, with inductances external to the transformers) are proportioned so that the magnitudes of the phase voltages will be equal at full load and the voltages will be angularly displaced from one another according to the number of phases. The larger the number of phases, the more closely the mean output voltage will approach the peak voltage (as $3/\pi$ with three phases) and the lower will be the percentage ripple voltage and current, so that the current supplied to the load will approximate to direct current.

If the load decreases, the angular displacement and magnitude of the voltages will change. As hereinafter described, these changes can be utilised in conjunction with the characteristics of the iron core of the transformer 2 for obtaining, within wide limits, zero or negative regulation, i. e. constant or decreasing mean output voltage with decreasing load. Even with a decreased load, a comparatively low ripple factor is maintained.

As also hereinafter explained, rectifying arrangements in accordance with the invention may have the further advantages of substantial insensitivity to supply-voltage fluctuations and of the maintenance of unity power factor over a range of conditions.

Figure 6:
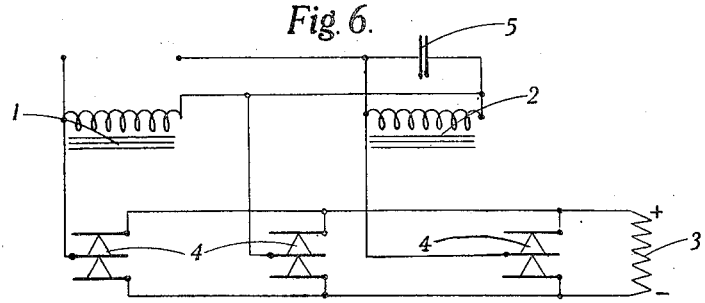
Figure 11:
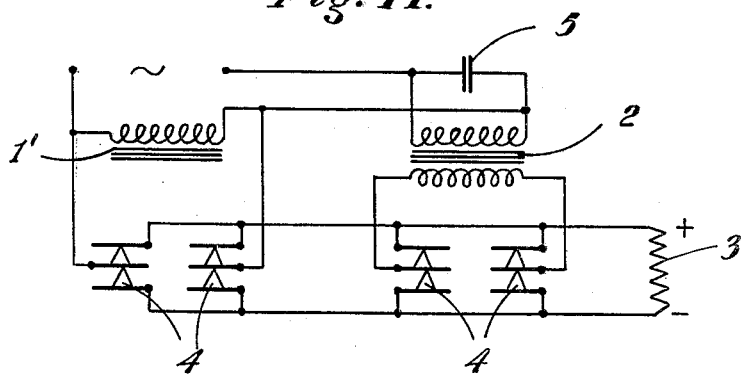

In a case where a transformer has a 1:1 ratio, a single winding may serve as primary and secondary winding and the transformer becomes actually a choke. In Fig. 11 one of the transformers is shown as a choke 1'. As a general rule, however, it is not permissible that both transformers should be thus represented by chokes, because the supply voltage would then act across the load. The exception to this rule is illustrated in Figure 6 which shows an arrangement for six-wave rectification. The choke 1 and the choke 2 and condenser 5 are designed so that the voltage on 1 is separated from the voltage on 2 by 120° and leads the current by the same angle $$\left(\frac{120°}{2}=60°\right)$$

as the latter voltage lags. With the supply voltage itself, there are thus three equal phases equally spaced at 60°. Transformers or autotransformers may be substituted for the chokes if a step up or down is required. Desired regulation characteristics can be obtained as with the examples previously described.

Other modifications are also possible: In place of the illustrated bridge connections of the rectifiers, other known circuits may be employed in conjunction with appropriate secondary windings on the transformers. Final precise adjustment of the performance of the rectifying arrangements may be provided for by a small addition or subtraction of capacity at the condenser 5 or by a small resistance in series with the condenser 5 and transformer 2 or with the supply or by a high resistance connected as an additional load on the transformer 1. The last-named measure permits of the voltages on the transformers being brought completely into phase, producing the minimum output voltage, at no load. Finally, additional smoothing means may be provided when required.

Principles underlying the design of rectifying arrangements in accordance with the invention will now be explained.

Assuming, for the moment, that the transformers 1, 2 in Figure 1 (without condenser 5) are identical, have a 1:1 ratio and negligible reactance, it can be shown that the value of the resistance R of the load 3 as reflected across the supply is 4R and the ratio $$\frac{\text{mean output volts}}{\text{mean input volts}} = \frac{1}{2}$$

If inductance is introduced across the primary of transformer 1, then the resistance as reflected by transformer 1 varies between 0 and 4R over the cycle whilst the value as reflected across the supply varies between R and 4R. As a result of the introduction of the inductance, therefore, the proportion of the total resistance reflected by transformer 1 is reduced and the impedance ($Z_1$) of transformer 1 becomes less than that ($Z_2$) of transformer 2 so that the voltage ($V_2$) across the latter becomes greater than that ($V_1$) across the former. At the same time, an angular displacement is produced between $V_1$ and $V_2$. Theoretically, a point can be reached at which the angle between $V_1$ and $V_2$ has become 90° and $V_1$ has declined to zero. Then the ratio $$\frac{\text{mean output volts}}{\text{mean input volts}}$$

becomes unity.

In practice, both transformers 1, 2 have inductance and, for the purposes of the present invention, the transformer 2 is loaded with the condenser 5 whose negative or capacitative reactance neutralises the positive or inductive reactance of the said transformer 2. In this case also the resistance R is reflected in a reduced proportion by the transformer 1 and the abovementioned angular separation of 90° and unity voltage ratio can be obtained. It is then found that the unity ratio is obtained whatever the ratio of $V_2/V_1$. If further positive and negative reactance are added to the transformers 1 and 2, the angular separation can be increased towards 180° and the ratio of mean output volts to mean input volts tends towards infinity.

In the practical rectifying arrangement, the primary factor which will change is the load, that is R will change. It can be shown that, owing to the unequal reflection of R, an increase of R itself from a value for which $Z_2=Z_1$ will result in $Z_2$ and $V_2$ becoming greater than $Z_1$ and $V_1$. Under the control of this condition, the saturation phenomena of the permeability of iron are utilised, as hereinafter described, to control the output voltage. By this means regulation can be obtained such that, within wide limits, (i) the mean output voltage varies inversely as R, or (ii) the said voltage remains substantially constant in spite of variation of R.

By way of example the case of rectification by an arrangement such as is shown in Figure 1 with two phases of equal magnitude and 90° apart will now be further considered. Symbols employed have their usual significance except where indicated. Suffixes 1, 2 and 5 indicate values applying to the transformers 1, 2 and condenser 5 respectively.

According to standard transformer formulae:

(1) $$V=\frac{4.44BANf}{10^8}$$

(2) $$L=\frac{0.4\pi N^2 A\mu}{10^8 l}$$

When B max$>\Phi$ (its value at the "knee" of the $\mu$/B max curve):

(3) $\mu=c-dB$ max ($c$ and $d$ being constants for a given iron alloy and gap ratio).

(4) From (1) and (3): $\mu=a-bV$ ($a$ and $b$ being constants). From (2) and (4):

$$L=k(a-bV)$$

($k$ being a constant).

Thus, considering transformer 2 alone, when $V_2>V\Phi$ (voltage corresponding to $B$ max=$\Phi$), reactance $X_2=2\pi fk(a-bV_2)$. When $V_2 \leq V\Phi$, $L_2$ is constant and $X_2=2\pi fL_2$.

Consider now the effect of condenser 5 of capacity C and negative reactance $$X_5 = \frac{10^6}{2\pi f C}$$

such that $$\frac{1}{2\pi f L_2} < \frac{2\pi f C}{10^6}$$

Now a rise of $V_2$ above $V_\Phi$ will tend to make $$\frac{1}{2\pi f k(a - bV_2)} = \frac{2\pi f C}{10^6}$$

giving a condition of parallel resonance. Let $V_R$ be the voltage at which this equality occurs. When $V_2 > V_R$, then $$\frac{1}{2\pi f k(a - bV_2)} > \frac{2\pi f C}{10^6}$$

As $V_2$ rises from $V_\Phi$ to $V_R$, therefore, a leading reactance current decreases towards zero and, when $V_2$ rises above $V_R$, there is an increasing lagging reactance current.

Consider now the effect of the transformer 1: The transformer 1 and parallel elements 2, 5 will require current such that the vector sum of $V_1$ and $V_2 = V_S$ (supply voltage $> V_R$). If the reactance $X_1$ is made numerically equal to or less than the negative reactance $X_{2,5}$ at $V_\Phi$, then $V_2$ will be above $V_R$ and both $V_1$ and $V_2$ will lead the resultant current. If the core of transformer 2 approaches saturation at $V_R$, so that Equation (4) is departed from to the extent that $b$ increases with $V_2$, then a small rise of $V_2$ above $V_R$ can cause the external reactance current to reach a high lagging value, $V_2$ becoming substantially in phase with $V_1$.

Consider now the transformers 1, 2 as having secondary windings, with equal ratios, connected through identical rectifiers 4 to load 3 of high resistance R: the mean output voltage will correspond to the RMS value of $V_R$ or $(V_S - V_R)$ whichever is the greater. If, then, $X_1$ is made constant and numerically equal to $X_{2,5}$ at $V_\Phi$ and if the reflected value of R is also made equal to the said reactance, the load current and voltage for transformer 1 will lead the resultant current by 45°. If $V_2$ is not more than $V_R$, the load current and voltage for 2, 5 will lag the resultant current by 45°. Thus, at full load, the voltages will be separated by 90° and will have each a value of $$V_S/\sqrt{2}$$

$V_\Phi$ is chosen so that it has the value $$V_S/\sqrt{2}$$

Then, as the voltages are equal and there is a common load, the output is equally divided between the transformers. If $x$ watts is the mean output required, RMS watts per transformer =

$$\frac{x(1.11)^2}{2}$$

and reactance per transformer =

$$\left\{\frac{V_S}{\sqrt{2}}\right\}^2 / \frac{x(1.11)^2}{2}$$

$$= V_S^2 / 1.232x \qquad (5)$$

The peak voltage is $$1.4 \frac{V_S}{\sqrt{2}}$$

The mean output voltage is given by $$\left(1.4 \frac{V_S}{\sqrt{2}}\right) \int_{\pi/4}^{\pi/2} \frac{\sin\theta \, d\theta}{\pi/2 - \pi/4} = 0.9 V_S \text{ approx.}$$

Figure 7 illustrates the relation of the voltages $V_1$ and $V_2$ under these (full load) conditions.

With decreasing load, as has been seen, $Z_2$ rises relatively to $Z_1$ and $V_2$ rises. Let $V_R$, whose value can be predetermined in design, be chosen so that $V_R/V_\Phi$ is near unity, say 1.1. Then $V_2$ may rise from $V_\Phi$ to $V_R$ with the effect of producing the above-described change in $X_{2,5}$. While $V_2$ rises, $V_1$ falls and closes into phase with $V_2$ and tends towards a condition in which it ceases to supply the load (Fig. 8). The peak voltage becomes $$V_R = 1.1 V_\Phi = 1.1 \frac{V_S}{\sqrt{2}}$$

and the mean output voltage can be calculated as 0.7 $V_S$ approx.

Thus, there is theoretically a fall of voltage of $$\frac{0.9 - 0.7}{0.9} = 22\%$$

The conditions at full and no loads are illustrated vectorially in Fig. 9. As the load decreases, the voltage vector $V_2$ moves through $45 + 90°$ and increases to the value OP. The vector $V_1$ moves through $90° - 45°$ and decreases to the value OQ. The current vector Is does not move, but only decreases in length.

It is apparent that the value of $V_R$, depending upon the total capacity with which $L_2$ resonates, is important for the design.

The total capacity C is greater than the value $C_L$ necessary to produce the reactance current equal to the load current at $$V_S/\sqrt{2}$$

volts by an amount needed to balance the lagging magnetising current of transformer 2.

From (5):

$$\frac{10^6}{2\pi f C_L} = \frac{V_S^2}{1.232x}$$

and $$C_L = \frac{1.232x \cdot 10^6}{V_S^2 \cdot 2\pi f}$$

If $\mu_R$ and $\mu_\Phi$ are the values of $\mu$ for transformer 2 at $V_R$ and $$V_\Phi (= V_S \sqrt{2})$$

volts respectively:

From (2):

$$\frac{10^6}{2\pi f(C - C_L)} = 2\pi f \mu_\Phi k_1$$

($k_1$ being a constant) and $$\frac{10^6}{2\pi f C} = 2\pi f \mu_R k_1$$

Thus $$C = \frac{C_L}{1 - \frac{\mu_R}{\mu_\Phi}} \qquad (6)$$

$\mu$ values can be chosen such that the flux need only change very slightly when the voltage changes from $V_\Phi$ to $V_R$. Consequently, very little rise of $V_2$ is then necessary to produce the required change of reactance.

It has been shown that, at no load, the mean output voltage is equal to the mean of the maximum value of $V_2$, i. e. approximately $0.9 V_R$. At full load, the output voltage is $0.9 V_S$. Thus, with decreasing load, the mean output voltage decreases from $0.9 V_S$ to $0.9 V_R$, that is there is negative regulation.

It can be shown that, if the load increases above the full-load assumed for the design, the impedance rapidly increases, $V_1$ and $V_2$ decrease and the mean output voltage tends towards half the mean supply voltage $= \frac{1}{2} \cdot 0.9 V_S = 0.45 V_S$. Thus an increase of loading above full load also results in a decrease of the mean output voltage.

It can also be shown that the power factor is substantially unity at full load and with overload. With decreasing load, the power factor remains substantially unity until $V_2$ passes $V_R$; it thereafter tends towards zero.

It can further be shown that an increase in the supply voltage increases $V_1$ and $V_2$ and decreases the angle between them. If the effect of the increased voltages is more than offset by the decrease in angle, the mean output voltage will fall. If the opposing effects are equal, the output voltage will remain constant. A decrease in supply voltage may likewise be accompanied by a rising or constant output. Thus the design may be made such that for a wide range of loading, the output remains substantially unaffected by wide fluctuations of supply voltage.

As a result of the above described relationship of $V_2$ to the "knee" point $V\Phi$, actually a flat-topped voltage wave is obtained and this tends to be flattened still further by the coaction of the condenser 5 and transformer 1 as no-load conditions are approached. The mean value of the flat-topped curve approximates to the mean value of the sine wave assumed in the above explanation. It results, however, in a further reduction of the percentage ripple volts.

General formulae for the reactances required with any given angle ($\psi°$) between the transformer voltages $V_1$ and $V_2$ and any given power factor have been found to hold for the following cases: (i) two equal phases equally or unequally spaced in relation to the fundamental period; (ii) three or more equal and equally spaced phases; (iii) where the reflected watt loadings of the two transformers are to be equal.

Let the angle by which $V_1$ leads the resultant current at full load be $\theta°$, so that $V_2$ lags the current by $(\psi-\theta)°$. Then it can be shown that $$X_1 = \frac{V_S^2 \sin \beta \cos[\psi-(\theta+\beta)]}{x . \sin \psi \sin \theta}$$

($x$ = total loading in RMS watts)

$$X_2 = \frac{X_1 \cos \theta}{\cos(\psi-\theta)}$$

Power factor $= \cos[\psi-(\theta+\beta)]$ $\beta$, the angle by which $V_2$ lags the supply voltage $V_s$ can be shown to be equal to:

$$\tan^{-1} \frac{\sin \psi}{\frac{\cos \theta}{\cos(\psi-\theta)} + \cos \psi}$$

The formulae can be readily modified to meet the case of $V_2$ also leading the current, but it would not seem that this should ever be necessary.

A specific example of design will now be outlined:

Let it be assumed that a D. C. output of 6 amperes at 60 volts is to be obtained by six-wave rectification from a supply of single phase A. C. at 230 volts and 50 cycles. The regulation is to be such that the output voltage falls with decreasing load. The power factor is to be unity at full load. The rectifying units are to be of the selenium type with a drop per "leg" of 10 volts.

The circuit arrangement is that of Fig. 2 or 3. Neglecting losses:

$$\text{RMS watts/transformer} = \frac{1.2.6}{2}(60+10) = 252$$

RMS volts/transformer $= 230/\sqrt{2} = 162.2$ $$X_1 = X_{2,5} = \frac{(162.2)^2}{252} = 105$$

$$L_1 = \frac{105}{2\pi f} = 0.334 \text{ henry}$$

Examination of $\mu/B$ max curves for, say, extra-special Stalloy, leads to a choice for transformer 1 of $B$ max $= 12,000$, $\mu = 570$ and gap ratio $= 0.0015$. Then, from (1) and (2), the volume of iron $l_1 A_1$ can be determined as 796.4 c.cs.

At full load, $X_{2,5} = -105$.

This will correspond to an effective capacity of 30.5 mfd.

From (6)

$$C = \frac{30.5}{1 - \frac{\mu_R}{\mu\phi}}$$

The choice of $\mu_R$ and $\mu\Phi$ is influenced by the desideratum that the rise of $V_2$, as the load decreases and $L_2$ and $C$ tend to resonance, should be a minimum. Inspection of the $\mu/B$ max curves shows that the iron should accordingly be worked with a very low gap ratio and at a high $B$ max, say $\mu_R = 900$ at $B$ max $= 14,000$ and $\mu\Phi = 1800$ at $B$ max $= 13,000$. Hence $$C = \frac{30.5}{1 - \frac{900}{1800}} = 61 \text{ mfd.}$$

Actual impedance $= 61 - 30.5 = 30.5$ mfd. Thus $L_2 = 0.334$ henry at 162.2 volts and $l_2 A_2 = 2145$ c.cs.

The iron losses can now be estimated as 11 and 32.6 watts for 1 and 2 respectively and, by taking these losses into account, the working voltages for 1 and 2 can be re-estimated as 159.4 and 165.8 respectively.

$X_1$ is re-estimated as 96.6
$L_1$ is re-estimated as .3075 henry
$l_1 A_1$ is re-estimated as 836.1 c.cs.

Suitable figures for transformer 1, obtained from the above by normal design, are 191 turns on No. 36 laminations to depth 3.56 in. and gap 0.008 in.

$X_{2,5}$ is re-estimated as corresponding to 32.96 mfds.
$C$ is re-estimated as 65.92 mfds.
$L_2$ is re-estimated as 0.3075 henry (at 165.8 volts)
$l_2 A_2$ is re-estimated as 2435 c.cs.

Suitable figures for transformer 2 are 108 turns on No. 41 laminations to depth 3.63 ins. with minimum gap possible. A relatively long path is selected to reduce the gap ratio.

With the transformer connection of Fig. 2, the number of turns in the secondary windings of the transformers 1 and 2 can be readily deduced as 54 and 52 (centre tapped) respectively.

For reasons of economy, a standard condenser suitable for 400 volts (RMS) working is preferably used as shown in Fig. 3. It can be estimated that a condenser of 11.32 mfd. connected across 260 turns in all will give the required result.

I claim:

1. A rectifying arrangement comprising, in combination with rectifying means, transformers having reactance associated with them and having their primary windings connected in series and adapted for being connected across a source of single phase alternating current and having their secondary windings connected in parallel through the rectifying means from which a load can be supplied with rectified current, and a capacitative reactor device connected in parallel with a winding of one of the transformers, the reactances associated with the transformers and the reactance of the capacitative reactor device being so related that, at the normal loading of the arrangement, the respective transformer voltages have a polyphase phase relationship.

2. A rectifying arrangement comprising, in combination with rectifying means, transformers having reactance associated with them and having their primary windings connected in series and adapted for being connected across a source of single phase alternating current and having their secondary windings connected in parallel through the rectifying means from which a load can be supplied with rectified current, and a capacitative reactor device connected across a winding of one of the transformers, the reactances associated with the transformers and the reactance of the said device being made such that at the normal loading of the arrangement, the respective transformer voltages have a polyphase phase relationship whilst, with decrease of loading from the normal value, the phase angle between the transformer voltages is reduced and one voltage decreases more rapidly than the other increases so that they tend towards a condition in which only one phase is effective.

3. A rectifying arrangement according to claim 1 wherein the capacitative reactor device and the transformer connected in parallel therewith form an oscillatory circuit and the voltage ($V\Phi$) corresponding to the "knee point" of the magnetisation of the iron core of this transformer is made approximately equal to the voltage (e. g. $Vs/\sqrt{2}$ with two phases at 90°) of the transformer at normal loading, whilst the voltage ($V_R$) corresponding to the resonance condition of the oscillatory circuit is made a little higher than $V\Phi$.

4. A rectifying arrangement comprising, in combination with rectifying means, transformers having reactance associated with them and having their primary windings connected in series and adapted for being connected across a source of single phase alternating current and having their secondary windings connected in parallel through the rectifying means from which a load can be supplied with rectified current, and an oscillatory circuit in which a capacitative reactor device is connected in parallel with a winding of one transformer, the said circuit having external reactance which is so related to the reactance associated with the other transformer that, at the normal loading of the arrangement, the respective transformer voltages have a polyphase phase relationship.

5. A rectifying arrangement according to claim 4, wherein the respective reactances are made numerically equal to each other at normal loading and are equal to the reflected value of the resistance of the said loading.

6. A rectifying arrangement according to claim 4, wherein the reactance associated with the other transformer is substantially constant between zero and normal loading.

7. A rectifying arrangement according to claim 4, wherein the transformer connected to the oscillatory circuit is so designed that the voltage ($V\Phi$) corresponding to the "knee" point in the magnetisation of the iron core of the said transformer is approximately equal to the voltage of this transformer at normal loading (e. g. $Vs/\sqrt{2}$ with two phases at 90°).

8. A rectifying arrangement according to claim 4, wherein the transformer connected to the oscillatory circuit is so designed that the voltage ($V\Phi$) corresponding to the "knee" point in the magnetisation of the iron core of the said transformer is approximately equal to the voltage of this transformer at normal loading (e. g. $Vs/\sqrt{2}$ with two phases at 90°) and the oscillatory circuit is so designed that the voltage ($V_R$) corresponding to the resonance condition of the said circuit is a little higher than the "knee point" voltage ($V\Phi$).

9. A rectifying arrangement comprising in combination with rectifying means, transformers having reactance associated with them and having their primary windings connected in series and adapted for being connected across a source of single phase alternating current and having their secondary windings connected in parallel through the rectifying means from which a load can be supplied with rectified current, and a capacitative reactor device connected across a winding of one transformer, the reactances associated with the transformers and the reactance of the capacitative reactor device being so related that, at the normal loading of the arrangement, the respective transformer voltages have a polyphase phase relationship and the said one transformer being designed to have, at normal loading, a flux density which is comparatively high in relation to that of the other and which is such that a small increase in flux density resultant upon decrease of loading from the normal value is accompanied by a comparatively large decrease in permeability.

10. A rectifying arrangement according to claim 9, wherein the said winding of the one transformer and the capacitative reactor device form an oscillatory circuit which tends to resonance upon a small increase of voltage resultant upon the decrease of loading.

11. A rectifying arrangement according to claim 4, wherein the capacitative reactor device comprises a condenser connected to the associated transformer in such fashion that it is subjected to a voltage higher than but proportional to the transformer voltage.

12. A rectifying arrangement comprising, in combination with rectifying means, inductive reactor devices which are connected in series with each other in a primary circuit and in parallel with each other through the rectifying means in a secondary circuit and a capacitative reactor device connected in parallel with one of the inductive reactor devices, the reactor devices being so proportioned in relation to each other and to a given normal load to be connected across the rectifying means that when a source of single phase alternating current is connected across the inductive reactor devices in series the voltages produced across the said devices and effective, through the rectifying means, across the load have a polyphase phase relationship.

13. A rectifying arrangement comprising inductive reactor devices connected in series with each other in a primary circuit and in parallel with each other in a secondary circuit, a capacitative reactor device connected in parallel with one of the inductive reactor devices, rectifying devices, and a load connected to the secondary circuit across each of the reactor devices through the rectifying devices, the reactor devices being designed to produce across the rectifying means a plurality of substantially equal voltages having a polyphase phase relationship when an alternating current is passed through the said reactor devices in series.

14. A rectifying arrangement comprising an inductive reactor device, a second, iron-cored, inductive reactor device connected in series with the first in a primary circuit, a capacitative reactor device connected in parallel with the second inductive reactor device, and rectifying means through which the inductive reactor devices are connected in parallel in a secondary circuit, the reactor devices being so proportioned in relation to each other and to a given normal load to be connected across the rectifying means that, when a source of given single-phase alternating current is connected across the inductive reactor devices in series, the external reactance value of the second inductive reactor device and the capacitative reactor device in parallel is capacitative and the voltages, produced across the said reactor devices and effective through the rectifying means across the load, have a polyphase phase relationship.

15. A rectifying arrangement according to claim 14, wherein the second, iron-cored, reactor device is arranged to control the external reactance value of the said reactor device and the capacitative reactor device in parallel in such manner that the output voltage of the arrangement does not increase, that is, decreases or remains substantially constant with decrease of loading from normal.

16. A rectifying arrangement according to claim 14, wherein the voltage (VΦ) corresponding to the "knee point" of the magnetisation of the iron core of the iron-cored reactor device is made approximately equal to the voltage (e. g. $V_S/\sqrt{2}$ with two phases at 90°) across the said reactor device at normal loading, whilst the voltage ($V_R$) corresponding to the resonance condition of the oscillatory circuit comprising the said reactor device and the capacitative reactor device in parallel is made a little higher than VΦ.

17. A rectifying arrangement according to claim 14, wherein the second, iron-cored, reactor device is designed to have, at normal loading, a flux density which is comparatively high in relation to that of the other inductive reactor device and which is such that a small increase in flux density resultant upon decrease of loading from the normal value is accompanied by a comparatively large decrease in permeability, the oscillatory circuit comprising the said second reactor device and the capacitative reactor device in parallel being designed to tend to resonance upon a small increase of voltage resultant upon decrease of loading.

18. A rectifying arrangement comprising rectifying means from which a load can be supplied with rectified current, two transformers having reactance associated with them and having their primary windings connected in series and adapted for being connected across a source of given single-phase alternating current and having their secondary windings connected in parallel through the rectifying means, and a condenser connected across a winding of one of the transformers, the reactances associated with the transformers and condenser being so related that, at the normal loading of the arrangement, the external reactance value of the condenser and transformer connected in parallel is capacitative and the respective transformer voltages have a polyphase phase relationship.

19. A rectifying arrangement comprising, in combination with rectifying means, two inductive reactor devices, one a transformer and the other a choke, the primary winding of the transformer and the choke being connected in series and adapted for being connected across a source of given single-phase alternating current whilst the secondary winding of the transformer and the choke are connected in parallel through the rectifying means from which a load can be supplied with rectified current, and a capacitative reactor device connected in parallel with one of the inductive reactor devices, the reactances of the reactor devices being so related that, at the normal loading of the arrangement, the voltages across the secondary of the transformer and the choke respectively have a polyphase phase relationship.

20. A rectifying arrangement comprising, in combination with rectifying means, two inductive reactor devices which are connected directly in series with each other across a source of given single-phase alternating current and are connected in parallel with each other and in parallel with the source of current through the rectifying means from which a load can be supplied with rectified current, and a capacitative reactor device connected in parallel with one of the inductive reactor devices, the reactances of the reactor devices being so related that, at the normal loading of the arrangement, the voltages across the inductive reactor devices lead and lag the current by 60°.

21. A regulating arrangement comprising an iron-cored inductance and a capacity connected in parallel with each other and with the load and in series with a second inductance across a source of supply of single-phase current of given frequency, wherein the first inductance is designed so that at voltages across it not exceeding the voltage (VΦ) corresponding to the "knee point" of the magnetisation of its core its reactance is substantially equal numerically to the reactance of the capacity and to the reactance of the second inductance which is substantially constant over the range of working, and for a slight rise above the said voltage the said reactance of the first inductance falls abruptly to a fraction of its previous value.

HAROLD MARTIN HARMER.